(12) United States Patent
Dorfner et al.

(10) Patent No.: US 9,479,016 B2
(45) Date of Patent: Oct. 25, 2016

(54) ELECTRIC MACHINE WITH BASE ELEMENT

(71) Applicant: Siemens Aktiengesellschaft, München (DE)

(72) Inventors: Matthias Dorfner, Kirchdorf am Inn (DE); Zeljko Jajtic, München (DE); Gerhard Matscheko, Starnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 313 days.

(21) Appl. No.: 14/015,187

(22) Filed: Aug. 30, 2013

(65) Prior Publication Data
US 2014/0062247 A1 Mar. 6, 2014

(30) Foreign Application Priority Data

Sep. 3, 2012 (EP) .................................... 12182710

(51) Int. Cl.
*H02K 1/27* (2006.01)
*H02K 15/03* (2006.01)

(52) U.S. Cl.
CPC ............ *H02K 1/274* (2013.01); *H02K 1/2773* (2013.01); *H02K 15/03* (2013.01); *H02K 2201/15* (2013.01); *Y10T 29/49009* (2015.01)

(58) Field of Classification Search
CPC .... H02K 1/274; H02K 1/2773; H02K 15/03; H02K 2201/15
USPC .............. 310/156.56, 156.53, 156.68, 49.36, 310/154.11, 154.13, 154.36, 154.74, 310/156.58, 156.59, 156.61, 156.65, 44; 29/598
See application file for complete search history.

(56) References Cited

U.S. PATENT DOCUMENTS 3,979,821 A * 9/1976 Noodleman ......... H02K 13/006
148/108
4,445,062 A * 4/1984 Glaser ................. H02K 1/2773
310/156.59

(Continued)

FOREIGN PATENT DOCUMENTS

CN 101232205 A 7/2008
DE 102006043893 A1 3/2008

(Continued)

OTHER PUBLICATIONS

English abstract of JP 59059057.*

(Continued)

*Primary Examiner* — Terrance Kenerly
*Assistant Examiner* — Ahmed Elnakib
(74) *Attorney, Agent, or Firm* — Henry M. Feiereisen LLC.

(57) ABSTRACT

An electric machine includes a primary section, a secondary section interacting with the primary section via an air gap during operation of the electric machine, and a first base element fastened to the secondary section. The base element includes a first pole shoe having a first end and a second end, with the second end of the first pole shoe facing the air gap, a second pole shoe having a first end and a second end, with the second end of the second pole shoe facing the air gap, and a permanent magnet disposed between the first pole shoe and the second pole shoe. The permanent magnet has a magnetization from the first pole shoe to the second pole shoe, and is formed by a matrix with a magnetically active material embedded therein.

24 Claims, 4 Drawing Sheets

(56) References Cited

U.S. PATENT DOCUMENTS

| | | | |
|---|---|---|---|
| 4,588,914 A * | 5/1986 | Heyne | H02K 1/2773 310/156.11 |
| 5,886,441 A * | 3/1999 | Uchida | H02K 1/2773 310/156.57 |
| 6,946,967 B2 | 9/2005 | Klaus et al. | |
| 7,057,312 B2 | 6/2006 | Hodzic et al. | |
| 7,271,509 B2 | 9/2007 | Hoppe et al. | |
| 7,332,839 B2 | 2/2008 | Jajtic | |
| 7,638,916 B2 | 12/2009 | Hoppe et al. | |
| 7,679,226 B2 | 3/2010 | Jajtic | |
| 7,737,597 B2 | 6/2010 | Jajtic et al. | |
| 7,746,064 B2 | 6/2010 | Jajtic | |
| 7,800,256 B2 | 9/2010 | Jajtic | |
| 7,834,489 B2 | 11/2010 | Matscheko | |
| 7,859,142 B2 | 12/2010 | Armeit et al. | |
| 7,859,143 B2 | 12/2010 | Jajtic et al. | |
| 7,863,782 B2 | 1/2011 | Matscheko | |
| 7,893,569 B2 | 2/2011 | Jajtic et al. | |
| 7,915,769 B2 | 3/2011 | Jajtic et al. | |
| 7,928,613 B2 | 4/2011 | Jajtic et al. | |
| 7,948,123 B2 | 5/2011 | Jajtic et al. | |
| 7,952,237 B2 | 5/2011 | Matscheko et al. | |
| 7,969,144 B2 | 6/2011 | Jajtic et al. | |
| 8,062,200 B2 | 11/2011 | Jajtic et al. | |
| 8,076,804 B2 | 12/2011 | Jajtic et al. | |
| 8,102,085 B2 | 1/2012 | Jajtic et al. | |
| 8,274,195 B2 | 9/2012 | Capka et al. | |
| 2003/0128006 A1 | 7/2003 | Klaus et al. | |
| 2004/0245860 A1 | 12/2004 | Hodzic et al. | |
| 2005/0001493 A1 | 1/2005 | Jajtic | |
| 2005/0006959 A1 | 1/2005 | Hoppe et al. | |
| 2006/0022175 A1 * | 2/2006 | Komuro | H01F 1/0572 252/500 |
| 2007/0222304 A1 | 9/2007 | Jajtic | |
| 2007/0236090 A1 | 10/2007 | Hoppe et al. | |
| 2007/0278865 A1 | 12/2007 | Matscheko | |
| 2008/0066548 A1 | 3/2008 | Jajtic | |
| 2008/0164830 A1 | 7/2008 | Jajtic | |
| 2008/0185932 A1 | 8/2008 | Jajtic et al. | |
| 2008/0190732 A1 | 8/2008 | Matscheko et al. | |
| 2008/0246466 A1 | 10/2008 | Jajtic et al. | |
| 2008/0265689 A1 | 10/2008 | Armeit et al. | |
| 2009/0039717 A1 | 2/2009 | Jajtic et al. | |
| 2009/0140583 A1 | 6/2009 | Matscheko | |
| 2009/0174266 A1 | 7/2009 | Jajtic et al. | |
| 2009/0179505 A1 | 7/2009 | Hoppe et al. | |
| 2009/0189465 A1 | 7/2009 | Matscheko | |
| 2009/0206681 A1 | 8/2009 | Jajtic et al. | |
| 2009/0206682 A1 | 8/2009 | Jajtic et al. | |
| 2009/0206684 A1 | 8/2009 | Jajtic et al. | |
| 2009/0243415 A1 * | 10/2009 | Hoppe | H02K 1/08 310/154.11 |
| 2009/0256428 A1 | 10/2009 | Jajtic et al. | |
| 2009/0258770 A1 | 10/2009 | Jajtic et al. | |
| 2009/0284104 A1 | 11/2009 | Knorr et al. | |
| 2009/0322162 A1 | 12/2009 | Jajtic et al. | |
| 2010/0026104 A1 | 2/2010 | Jajtic et al. | |
| 2010/0040448 A1 | 2/2010 | Knorr et al. | |
| 2010/0083851 A1 | 4/2010 | Matscheko et al. | |
| 2010/0219702 A1 | 9/2010 | Jajtic et al. | |
| 2010/0231059 A1 | 9/2010 | Matscheko | |
| 2010/0301684 A1 | 12/2010 | Matscheko et al. | |
| 2011/0133587 A1 | 6/2011 | Capka et al. | |
| 2012/0193172 A1 | 8/2012 | Matscheko et al. | |

FOREIGN PATENT DOCUMENTS

| | | | |
|---|---|---|---|
| EP | 2484464 | * | 8/2012 |
| EP | 2484464 A1 | | 8/2012 |
| JP | 59059057 | * | 4/1984 |
| JP | 59059067 A | | 4/1984 |
| JP | S5959057 A | | 4/1984 |

OTHER PUBLICATIONS

English abstract for JP 59059057; Japan; Apr. 1984; Shigeki et al.*
Hanselman Duane DR.; "Brushless permanent magnet motor design"; Cranston, R. I.; gefunden am Sep. 16, 2014 im Internet: URL:http://libris.kb.se/resource/bib/8954283; ISBN: 978-1-93-213363-9; XP055140659;; 2003; US; Jan. 1, 2013.

* cited by examiner

ELECTRIC MACHINE WITH BASE ELEMENT

CROSS-REFERENCES TO RELATED APPLICATIONS

This application claims the priority of European Patent Application, Serial No. 12182710, filed Sep. 3, 2012, pursuant to 35 U.S.C. 119(a)-(d), the disclosure of which is incorporated herein by reference in its entirety as if fully set forth herein.

BACKGROUND OF THE INVENTION

The present invention relates to the field of electric machines.

The following discussion of related art is provided to assist the reader in understanding the advantages of the invention, and is not to be construed as an admission that this related art is prior art to this invention.

An electric machine is used for energy conversion between electrical and mechanical energy. The electric machine must apply forces or absorb forces in very different operating situations, in order to satisfy the requirements set for it. The occurring operating situations can range from stoppage of an electric machine to movement at very high speed. A stoppage operating situation can occur increasingly for example in an electric machine when the electric machine has to perform positioning tasks. During such tasks, the electric machine must apply very significant forces to maintain a specified position. A very high speed operating situation can occur for example when a rapid change is to take place from a first position to a second position. A further example of an operating situation, in which a high speed may be required, is also uniform movement over a long time period. Requirements set for the performance of an electric machine are therefore very stringent.

It would therefore be desirable and advantageous to provide an improved electric machine to obviate prior art shortcomings.

SUMMARY OF THE INVENTION

According to one aspect of the present invention, an electric machine includes a primary section, a secondary section interacting with the primary section via an air gap during operation of the electric machine, and a first base element fastened to the secondary section and including a first pole shoe having a first end and a second end, with the second end of the first pole shoe facing the air gap, a second pole shoe having a first end and a second end, with the second end of the second pole shoe facing the air gap, and a permanent magnet disposed between the first pole shoe and the second pole shoe and having a magnetization from the first pole shoe to the second pole shoe, said permanent magnet having a matrix with a magnetically active material embedded therein.

According to another aspect of the present invention, a base element for an electric machine includes a first pole shoe having a first end and a second end, with the second end of the first pole shoe facing an air gap between a primary section and a secondary section of the electric machine, a second pole shoe having a first end and a second end, with the second end of the second pole shoe facing the air gap, and a permanent magnet disposed between the first pole shoe and the second pole shoe and having a magnetization from the first pole shoe to the second pole shoe, said permanent magnet having a matrix with a magnetically active material embedded therein.

According to still another aspect of the present invention, a secondary section for an electric machine includes a support having a cylindrical base form for securement of a base element having a pole shoe, wherein a surface normal of a lateral surface of the cylindrical base form extends from a first end of the first pole shoe to a second end of the first pole shoe.

According to yet another aspect of the present invention, a machine tool includes an electric machine having a primary section, a secondary section interacting with the primary section via an air gap during operation of the electric machine, and a base element fastened to the secondary section and including a first pole shoe having a first end and a second end, with the second end of the first pole shoe facing the air gap, a second pole shoe having a first end and a second end, with the second end of the second pole shoe facing the air gap, and a permanent magnet disposed between the first pole shoe and the second pole shoe and having a magnetization from the first pole shoe to the second pole shoe, said permanent magnet having a matrix with a magnetically active material embedded therein According to still another aspect of the present invention, a method for producing a base element for an electric machine includes embedding magnetically active material in a matrix to produce a permanent magnet, and disposing the permanent magnet between a first pole shoe and a second pole shoe The present invention resolves prior art problems by providing a permanent magnet disposed between the first and second pole shoes and having a matrix in which the magnetically active material is embedded. The magnetic flux advantageously produced by the magnetically active material is to a large degree made available at the second end of the first and second pole shoes. High performance of the electric machine is thus achieved. One reason why the production of the magnetic flux by the magnetically active material embedded in the matrix is advantageous is that the change in the magnetization of the permanent magnet due to it being heated less in an operating situation in which the electric machine brings about a movement at high speed over quite a long time period remains quite small. The magnetic properties of the magnetically active material can be utilized to a greater degree for the electric machine, thereby improving the performance of the electric machine.

Advantageously, the first pole shoe, the second pole shoe and the permanent magnet can be fastened to the secondary section as a unit. Therefore, the performance of the secondary section or the electric machine can be improved.

An electric machine can advantageously be produced using cost-optimized mass production. More economical materials can advantageously be used for an electric machine according to the present invention. The term "magnetically active material" relates to a material which is ferromagnetic or ferromagnetic.

During operation of the electric machine the primary section moves relative to the secondary section or the secondary section moves relative to the primary section, or the primary and secondary sections are held in a specified position to provide force. During operation of the electric machine the secondary section can interact by way of the air gap with the primary section, in that the primary section has at least one winding, in which an electric current can flow.

First directions of the base element are defined in that they run from the first end of the first or second pole shoe to the second end of the first or second pole shoe. Second directions of the base element are defined in that they run from the first pole shoe through the permanent magnet to the second pole shoe.

The matrix can advantageously include a material, which is electrically insulating, in order to achieve a smaller degree of heating of the permanent magnet due to eddy currents in the permanent magnet in an operating situation, in which the electric machine brings about movement at high speed over quite a long time period. Electrically insulating materials have a conductance, which can be typically less than $10^{-8}$ S/m. The electrically insulating material can be for example a plastic.

The magnetically active material can have an anisotropy. The anisotropy can be an intrinsic anisotropy or a crystalline anisotropy. The anisotropy is advantageously used to improve the production and provision of the magnetic flux to a large degree at the second end of the first and second pole shoes.

The matrix can be present in a different form before and during production of a base element. Thus the matrix can be in powder form, granular or in a viscous state before and to some extent during production and can be transformed to a solid form by one or more production steps. This allows simple processing before and during the production of the base element. In particular a matrix structure, which results in the solid form, forms in the one or more production steps.

In addition to the advantages cited above a base element according to the present invention also has the further advantage that it can be manufactured with high precision due to its simple structure. This improves the performance of the electric machine, which comprises the base element.

A secondary section according to the present invention also has the further advantage that the base element is fastened to the secondary section. The secondary section can therefore absorb significant forces acting on the base element during operation of the electric machine. This improves the performance of the secondary section and therefore of the electric machine.

A machine tool according to the present invention also has the further advantage that the machine tool includes an electric machine according to the present invention, which can hold a workpiece in position for milling and which can make the workpiece rotate continuously about an axis of rotation for turning. The workpiece can advantageously be connected to the secondary section in a rotationally fixed manner by way of a fastening element so that during operation of the electric machine when the secondary section rotates continuously about the axis of rotation at a specified rotation speed, the workpiece also rotates continuously about the axis of rotation at the specified rotation speed. It is thus possible with the same inventive machine and the same fastening means to hold the workpiece in position with a significant force for milling and to produce a continuous rotational movement at high rotation speed for turning. It is further advantageous that no transmission is required for this so that space requirements are kept to a minimum. Turning can advantageously be performed on the workpiece for quite a long time period at high rotation speed without the heating of a permanent magnet of an inventive electric machine resulting in irreversible weakening of the magnetization of the permanent magnet at least locally, which can have an adverse effect on the performance of an electric machine.

A method according to the present invention for producing a base element for an electric machine according to the present invention also has the further advantage that the production of the permanent magnet between the first and second pole shoes is restricted to the base element. This advantageously allows an apparatus for producing the base element to be embodied smaller, so that the method for producing the base element can be performed very accurately. This improves the performance of the base element or the electric machine.

According to another advantageous feature of the present invention, the spatial proportion of the magnetically active material can be greater than the spatial proportion of the matrix. The larger spatial proportion of the magnetically active material embedded in the matrix means that a high magnetic flux is achieved, thereby improving the performance of the inventive electric machine.

The magnetically active material can be distributed homogeneously in the matrix, to achieve a homogeneous magnetic flux. To this end with an inventive method for producing a base element for an inventive electric machine the magnetically active material, which is distributed homogeneously in the matrix, can be introduced into a tool together with the matrix. As the homogeneous arrangement of the magnetically active material in the matrix can be achieved more precisely before introduction into the tool, a more homogeneous magnetic flux is thus achieved.

The permanent magnet can include the magnetically active material with a spatial proportion of 60 to 80%. The performance of the inventive electric machine is advantageously improved in this range. In this range, a high spatial proportion of the magnetically active material is achieved without any perceptible deterioration of its properties during production of the permanent magnet.

According to another advantageous feature of the present invention, the permanent magnet can be produced by compressing the matrix with the magnetically active material. Significant compression of the matrix with the magnetically active material allows a high level of remanence to be achieved. The matrix with the magnetically active material is compressed in such a manner that the increase in the magnetic flux is such that the permanent magnet has a high level of remanence. Compression can be achieved for example by compression molding.

The permanent magnet can be produced by compressing the matrix with the magnetically active material from a volume that comprises the matrix and the magnetically active material, with the volume being 1.3 to 2 times greater than a volume formed by the permanent magnet. Compressing the matrix with the magnetically active material by the abovementioned factor advantageously allows a high coercive field strength as well as a high level of remanence to be achieved in permanent magnets.

With an inventive method for producing an inventive base element compression can take place in a third direction, which runs transverse, in particular perpendicular, to the first and second directions of the base element. As an inventive electric machine has inventive base elements, which generally have minor changes in the configuration of the first or second pole shoe in the third direction, even compression of the matrix with the magnetically active material can be achieved by means of a stamp. This allows better homogeneous distribution of the magnetically active material in the matrix to be achieved.

With a method for producing an inventive base element, the first and second pole shoes can be inserted into a tool, so that a cavity is formed between the first and second pole shoes. The matrix and the magnetically active material can then be compressed into the cavity. The first and second pole shoes can advantageously protect the tool from the matrix and the magnetically active material. During compression of the matrix with the magnetically active material the tool is kept at a higher temperature to facilitate compression.

According to another advantageous feature of the present invention, a method according to the present invention can have the steps of placing the first and second pole shoes in a tool, introducing the matrix into the tool in powder or granular form or in a viscous state with the magnetically active material, compressing the matrix with the magnetically active material in the tool by a factor 1.3 to 2, with the tool having a temperature which is in a working range, applying to the tool an external magnetic field which is directed from the first pole shoe to the second pole shoe, lowering a temperature of the tool to a temperature below the working range after elapse of a specified time period, and deactivating the external magnetic field after the tool has cooled to a residual temperature.

The matrix and the magnetically active material can be heated before introduction into the tool to an introduction temperature within a temperature range, in which the matrix has a viscous state. The viscous state of the matrix is characterized in that it is fluid. The magnetically active material can advantageously have a magnetically active portion, which can only be compressed to a minor degree at introduction temperature.

If the matrix is introduced into the tool in powder form, there is no need to heat the matrix before introduction into the tool or it is sufficient to heat it slightly to a temperature below the working range.

Compression by the factor 1.3 to 2 can advantageously be achieved by a pressure in the range from 5 to 11 t/cm$^2$ for an inventive electric machine.

The tool is heated at least to a temperature in the working range and kept at this temperature when the matrix touches the first and second pole shoes. The external magnetic field can be applied to the tool in such a manner that the external magnetic field flows homogeneously through the cavity between the first and second pole shoes so that the magnetically active material is to a large degree aligned in a direction which brings about a high flux at the second end of the first and second pole shoes.

The working range can be 100° C. to 150° C. In this working range highly coercive properties of the magnetically active material do not change to the degree they change during sintering of the magnetically active material. Up to 1000° C. must prevail for the production of a permanent magnet using a standard sintering method. With an inventive base element with inventive production in the working range from 100° C. to 150° C. it is advantageously possible to utilize the magnetic properties of the magnetically active material, in particular a rare earth element.

Once the tool has cooled to the residual temperature, the structure of the matrix is formed, which results in the solid matrix form. The matrix has such a solid form that the magnetically active material in the matrix is fixed during operation of the electric machine. In particular after production of the base element the structure of the matrix comprises chemical compounds to this end, which form in the matrix subject to heating after introduction into the tool.

If the matrix comprises a plastic, the plastic is cured to residual temperature after the tool has cooled.

The matrix can include a plastic which is supplied before production in the other form as a compound or mixture, in particular in powder or granular form or in a viscous state. The compound or mixture was prepared specifically by means of a compounding or plastic preparation process for the production and use of the inventive base element.

After curing the permanent magnet can be remagnetized with an external magnetic field. This increases the magnetic properties, e.g. the remanent flux density, still further. Remagnetization can take place with a magnetic flux density of 4.5 T. Remagnetization can take place with an external magnetic field generated at the tool. This means there is no need for any additional apparatus for remagnetization.

The matrix can include a duroplast (thermoset). A duroplast allows advantageous compression of the matrix with the magnetically active material, in particular for compression by compression molding. After curing duroplasts have a high mechanical resistance even at higher temperatures during operation of the electric machine, so that during operation of the electric machine the magnetically active material is fixed in position in the matrix within the permanent magnet to produce a high magnetic flux.

The matrix can be provided as powder before introduction into the tool, with the magnetically active material mixed therein. It is thus possible to achieve even compression of the matrix with the magnetically active material, thereby improving the performance of an inventive electric machine.

The magnetically active material can have a surface, which comprises a material which can enter into a material-fit connection with the matrix. This further improves the compression of the matrix with the embedded magnetically active material.

If the magnetically active material has an anisotropy, in particular an intrinsic anisotropy and/or a crystalline anisotropy, the magnetically active material can align itself in the matrix along a preferred direction predefined by the external magnetic field, as long as the matrix has a powder, granular or viscous state, in other words has not yet solidified. The anisotropy can thus advantageously be used to improve the production and provision of the magnetic flux to a large degree at the second end of the first and second pole shoes.

According to another advantageous feature of the present invention, the magnetically active material can include a ferrite or chemical element, which is a rare earth element. The magnetically active material can comprise for example a samarium cobalt alloy or a neodymium iron boron alloy. It is thus advantageously possible to utilize the magnetic properties of the ferrite, the rare earth elements, the samarium cobalt alloy or the neodymium iron boron alloy. This improves the power properties of the inventive electric machine.

According to another advantageous feature of the present invention, the magnetically active material can include grains, which have an oxide layer and a magnetically active portion, with the magnetically active portion of the grains being enclosed at least partially by the oxide layer. The oxide layer advantageously reduces eddy currents which can flow between the grains when two grains are in contact or between a number of grains. The performance of an inventive electric machine is thus also improved in particular in an embodiment in which the permanent magnet was produced by compression of the matrix with the magnetically active material.

The inventive embodiment can advantageously improve power properties in an inventive electric machine, when this latter is operated at a high base frequency. At the high base frequency the power properties of the inventive electric machine are reduced much less by the eddy currents of the high base frequency. The base frequency is the product of the number of pole pairs and the rotation speed of an electric machine.

An inventive electric machine can have windings in the form of tooth coil windings. The inventive embodiment of the electric machine also advantageously reduces eddy currents here, thereby improving power properties.

If the magnetically active material of an inventive electric machine according to an advantageous embodiment described above comprises a ferrite or a chemical element, which is a rare earth element, or a samarium cobalt alloy or a neodymium iron boron alloy, the magnetically active portion can advantageously comprise the ferrite or the chemical element, which is a rare earth element, or the samarium cobalt alloy or the neodymium iron boron alloy.

According to another advantageous feature of the present invention, the permanent magnet can be arranged to separate a first region of the base element and a second region of the base element from one another, with the first pole shoe including the first region with magnetically soft properties and a magnetic permeability index of $\mu_r>2$ and the second pole shoe including the second region with magnetically soft properties and a magnetic permeability index of $\mu_r>2$. The magnetic flux produced by the magnetically active material is thus to a large degree made available at the second end of the first and second pole shoes. This improves the performance of an inventive electric machine. For ferrites the magnetic permeability index $\mu_r$ has a value from 4 to 15,000 and for ferromagnetic materials it has a value from 300 to 600,000.

The second ends of the first and second pole shoes can be connected with a material, which has a magnetic permeability index of $\mu_r<2$, in particular $\mu_r\approx1$. This advantageously allows the leakage flux at the second ends of the first and second pole shoes to be reduced. The material with the magnetic permeability index $\mu_r<2$, in particular $\mu_r\approx1$, advantageously connects the first pole shoe to the second pole shoe before insertion into the tool. This contributes to a defined positioning of the first and second pole shoes in the tool, which improves the performance of the inventive electric machine.

The permanent magnet can separate further first regions of the base element and further second regions of the base element from one another, with the first pole shoe comprising the further first regions with magnetically soft properties and a magnetic permeability index of $\mu_r>2$ and the second pole shoe comprising the further second regions with magnetically soft properties and a magnetic permeability index of $\mu_r>2$. This allows the first region and the further first regions or the second region and the further second regions to be separated electrically with a high resistance by an insulating layer, which reduces eddy currents between the regions during operation of the inventive electric machine. The performance of an inventive electric machine can thus be improved.

The first and second pole shoes can be formed by ferromagnetic sheets, in particular electrical steel sheets, which are coated. The ferromagnetic sheets, in particular the electrical steel sheets, can be provided with an insulating layer, which causes the eddy currents to be reduced. The performance of an inventive electric machine can thus be improved. The ferromagnetic sheets, in particular the electrical steel sheets, of the first pole shoe can form the first region and the further first regions here. The ferromagnetic sheets, in particular the electrical steel sheets, of the second pole shoe can form the second region and the further second regions here.

The secondary section, in particular a support, which the secondary section has for fastening a base element to the secondary section, can be made of a mechanically resistant material, which has a magnetic permeability index of $\mu_r<2$, in particular $\mu_r=1$, for example an austenitic stainless steel, aluminum or a fiber composite. This advantageously reduces the leakage flux in the secondary section, in particular in the support. The support made of the mechanically resistant material connects the base element in a mechanically resistant manner to the secondary section. This improves the performance of an inventive electric machine, as the base element is held on the secondary section in a defined position relative to the secondary section even during operation of the electric machine.

According to another advantageous feature of the present invention, the permanent magnet can have a first contact surface with the first pole shoe and a second contact surface with the second pole shoe. The magnetic flux is thus conveyed from the permanent magnet over a short distance into the first pole shoe and the second pole shoe. This improves the provision of a high magnetic flux at the second end of the first pole shoe and at the second end of the second pole shoe. This improves the performance of the inventive electric machine of the inventive electric motor.

The first contact surface can touch the first pole shoe directly on the first region and the second contact surface can touch the second pole shoe directly on the second pole shoe. The magnetic flux, which is produced by the permanent magnet, is thus conveyed over a short distance into the first region or into the second region.

When with the inventive method for producing an inventive base element the permanent magnet is produced by compressing the matrix with the magnetically active material, a large contact surface of the permanent magnet can advantageously be produced with the first region of the first pole shoe and a large contact region of the permanent magnet can advantageously be produced with the second region of the second pole shoe. The magnetic flux produced by the permanent magnet is thus largely conveyed from the permanent magnet into the first or second pole shoe.

According to another advantageous feature of the present invention, the first pole shoe can be connected to the permanent magnet by first connectors. This ensures that the magnetic flux produced by the permanent magnet is conveyed over a short distance into the first pole shoe. This improves the performance of an inventive electric machine.

The first connectors can connect the first pole shoe to the permanent magnet in such a manner that displacement of the permanent magnet due to a force component parallel to the first contact surface during operation of the electric machine can be reduced. This improves the performance of an inventive electric machine, as the contact surface between the first pole shoe and the permanent magnet is maintained even when there are stringent requirements for the performance of the inventive electric machine during operation.

The first connectors can be configured to prevent displacement of the permanent magnet due to a force component perpendicular to the first contact surface. As a result, during operation of an inventive electric machine, the magnetic flux is conveyed over a short distance from the permanent magnet into the first pole shoe.

The first pole shoe can be connected to the permanent magnet with a force fit by way of the first connectors. A force-fit connection allows a connection between the permanent magnet and the first pole shoe even in the event of material displacement in the permanent magnet during operation of the inventive electric machine, allowing the magnetic flux produced by the permanent magnet to be conveyed over a short distance into the first pole shoe.

The first pole shoe can be connected to the permanent magnet with a form fit by way of the first connectors. The permanent magnet can have a matching piece to the first connectors, with the first pole shoe being connected to the permanent magnet by a form-fit connection between the matching piece and the first connectors. the form-fit connection is advantageously produced during production of the permanent magnet.

The first pole shoe can be connected to the permanent magnet with a material fit by way of the first connectors. The material-fit connection can advantageously take place during production of the permanent magnet. To this end the first pole shoe can be provided with an adhesive on the first contact surface or another surface, said adhesive entering into a material-fit connection with the first pole shoe and entering into a material-fit connection with the matrix and/or the magnetically active material. The material-fit connections can be strengthened by the action of the introduction temperature.

The second pole shoe can—as described for the first pole shoe—advantageously be connected to the permanent magnet by way of a second connectors.

The first pole shoe can have a component which is connected as a single piece to the first connectors. The first connectors can thus be produced in a simple manner when producing the component.

The component can be a metal sheet. The first connectors can be produced with a high level of accuracy on the metal sheet.

The first connectors can be an intermediate space between a first and second component of the first pole shoe. The matrix and the magnetically active material can thus penetrate into the intermediate space and solidify during production of the permanent magnet. This advantageously produces a first connectors, which allows the magnetic flux produced by the permanent magnet to be conveyed over a short distance into the pole shoe.

The first connectors can advantageously include the insulating layer of the metal sheets. A material-fit connection can advantageously be produced between the matrix or the magnetically active material and a material of the insulating layer during production of the permanent magnet.

A connection between the first connectors of the first pole shoe and the second connectors of the second pole shoe can advantageously be improved with a form fit by the magnetically active material, in particular if the permanent magnet is produced by compressing the matrix with the magnetically active material.

According to another advantageous feature of the present invention, at least a second base element can be fastened to the secondary section and can have a first pole shoe extending along the second pole shoe of the first base element from the first end of the second pole shoe to the second end of the second pole shoe of the first base element, a second pole shoe, and a permanent magnet having a magnetization from the second pole shoe of the second base element to the first pole shoe of the base element. The magnetic flux produced by the permanent magnet and the further permanent magnet is thus advantageously provided in a largely improved manner at the second end of the second pole shoe and the second end of the further first pole shoe. This improves the performance of an inventive electric machine.

The surfaces of the second ends of the further first pole shoe and the second pole shoe, which are linearly independent, in particular perpendicular, in relation to the surfaces formed by the first directions and second directions, adjoin directly neighboring points directly adjacent to one another and incline toward the permanent magnet and the further permanent magnet so that ideally the surfaces of the second ends of the further first pole shoe and the second pole shoe form a continuous surface which is curved so that the surface inclines toward the permanent magnet and the further permanent magnet. Latching moments, which have their cause in an embodiment of the transition between the second pole shoe and the first pole shoe, are thus kept small.

An electric machine according to the present invention can have further base elements which are fastened to the secondary section and extend along the secondary section in line with the base element and the second base element. A space along the secondary section is thus largely utilized to produce magnetic fluxes and to provide these to a large degree at the second ends of the pole shoes of the base element, the second base element and the further base elements. This improves the performance of an inventive electric machine.

In an inventive method for producing a base element the deviations of the base elements produced using the inventive method are determined by the method, in particular by the dimensions of the tool. In particular the deviations of the base elements are not influenced by deviations of dimensions of the first pole shoe and/or the second pole shoe, in particular deviations of measurements of the first pole shoe and/or the second pole shoe in the second directions.

The base elements fastened to the secondary section can have a deviation in the second directions, as determined by the method for producing an inventive base element and the tool. The production of the permanent magnet between the first and second pole shoes in a tool allows extremely accurate production of the base element, in particular in relation to its dimensions in the second directions. This improves the performance of an inventive electric machine. The deviation of the base elements from one another, in particular in the second directions, can thus be smaller than 0.6 mm.

The base elements can be disposed along the secondary section in such a manner that a gap, which is smaller than 0.6 mm, extends between a pole shoe of a first of the base elements and a pole shoe of a second of the base elements. This is possible due to the very accurate production of the inventive base elements. This improves the performance of an inventive electric machine.

The secondary section can include a support for fastening the base element to the secondary section, with the base elements filling a space between support and air gap. The space is advantageously filled in particular by the close connection required for production purposes between permanent magnets and pole shoes. Thus all the space between support and air gap is utilized for the performance of an inventive electric machine.

According to another advantageous feature of the present invention, the secondary section can have a support, which has a cylindrical base form, said base element being fastened to the support, wherein a surface normal of a lateral surface of the cylindrical base form extends from the first end of the first pole shoe to the second end of the first pole shoe. The very accurate production of an inventive base element allows the base elements to be disposed concentrically on a lateral surface of a cylindrical base form, with gaps between the base elements having very small dimensions. The space around the lateral surface is thus utilized to a large degree to produce a magnetic flux by means of permanent magnets and the provision of the magnetic flux is largely achieved on the pole shoes of the base elements.

In a further advantageous embodiment of an inventive electric machine the electric machine is a torque motor. Due to the base element a high magnetic flux is largely made available at the second end of the first and second pole shoes, its path being closed over a short distance by way of the air gap and the primary section. This produces a high force density which can be utilized for large torques in a torque motor. Force densities of 5 to 20 N/cm$^2$ are possible in a fluid-cooled torque motor. Force density here refers to the force supplied by an electric machine in relation to a surface of the secondary section limiting the air gap.

In particular with an inventive torque motor the high force density is reduced to a lesser degree by eddy currents or heating of the permanent magnets at high base frequencies. It is therefore possible to use the torque motor both for positioning tasks and for tasks at high rotation speed without any significant deterioration in force density and the power properties of the torque motor. The torque motor can thus advantageously be used at base frequencies from 50 Hz to 2 kHz.

In a further exemplary embodiment of an inventive electric machine, the magnetically active material does not contain a chemical element, in particular a rare earth element, in the concentration required to reduce the deterioration of the highly coercive properties of the magnetically active material during a sinter process.

During the inventive use of the magnetically active material sintering is dispensed with so the magnetically active material is not necessary for inventive use in an inventive electric machine or an inventive base element.

During production of the magnetically active material, in particular before or during the production of an inventive base element, it is not necessary actively to add any chemical elements, in particular any rare earth elements. In particular dysprosium does not have to be added to the magnetically active material to reduce the deterioration of the highly coercive properties due to a sinter process. The power properties of an inventive electric machine can thus be advantageously improved, with the advantage that the dysprosium costs are saved.

The magnetically active material can be in powder form and have grains. The magnetically active material can thus be supplied in any form. The grains can advantageously have an oxide layer, as described.

The grains can advantageously also have a plastic coating. If the matrix comprises a duroplast, the plastic is advantageously a duroplast.

The magnetically active material can advantageously be mixed with a component of the matrix or the components of the matrix in powder form. It is thus necessary to provide only a few or no further materials for the permanent magnet when producing an inventive base element. If the magnetically active material is mixed with a component of the matrix or the components of the matrix in powder form, a more homogeneous distribution of the magnetically active material in the permanent magnet can also be improved.

The grains of the magnetically active material can have a surface which to some degree at least has an interactive surface, which interacts with the matrix. This can improve inter alia the compression of the matrix with the magnetically active material.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
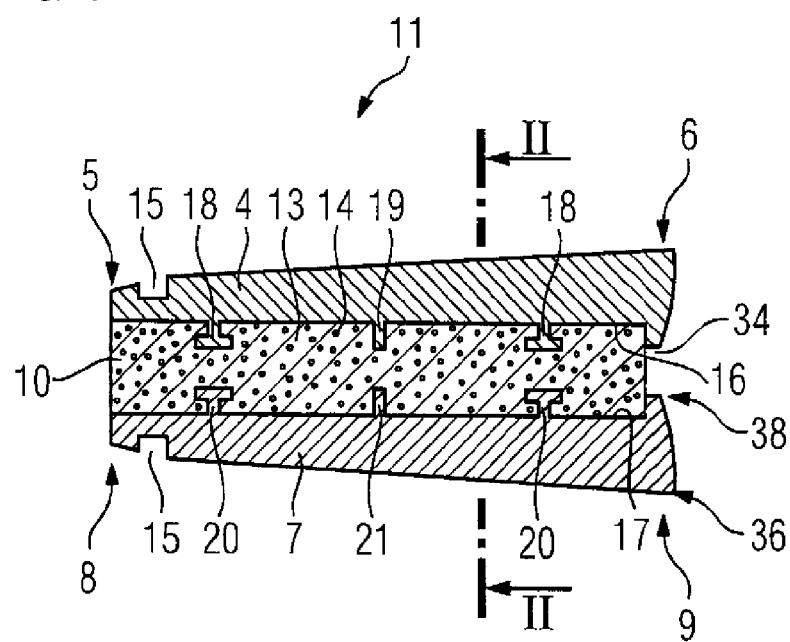
FIG. 1 shows an exemplary embodiment of a base element.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary embodiment of a base element 11 for an electric machine. The base element 11 comprises a first pole shoe 4, a second pole shoe 7 and a permanent magnet 10. The permanent magnet 10 has magnetization running from the first pole shoe 4 to the second pole shoe 7, with the permanent magnet 10 being disposed between the first pole shoe 4 and the second pole shoe 7. The permanent magnet 10 has a matrix 13, in which a magnetically active material 14 is embedded. The first pole shoe 4 has a first end 5 and a second end 6. The second pole shoe 7 has a first end 8 and a second end 9. An opening 34 advantageously allows a reduction of the leakage flux at the second ends 6, 9 of the first pole shoe 4 and the second pole shoe 7. In a different exemplary embodiment the opening 34 can be closed off by means of a non-magnetic weld seam, e.g. of NiCr.

The first pole shoe 4 is connected to the permanent magnet 10 by way of first connectors 18. The first connectors 18 are T-shaped and thus reduce any displacement of the permanent magnet 10 during operation of an electric machine, which comprises the base element 11, due to a force component parallel to a first contact surface 16. Because the first connectors 18 are T-shaped, they also prevent any displacement of the permanent magnet 10 due to a force component perpendicular to the first contact surface 16. The first pole shoe 4 has a further connector 19, which due to its form fit with the permanent magnet 10 largely reduces any displacement of the permanent magnet 10 during operation of an electric machine due to a force component parallel to the first contact surface 16. The second pole shoe 7 has a second connectors 20 and a further connector 21. These connectors 20, 21 act in the same way as the connectors of the first pole shoe 4.

The base element 11 has cutouts 15 on the first pole shoe 4 and the second pole shoe 7, which can serve to fasten the base element 11 to a secondary section.

Figure 2:
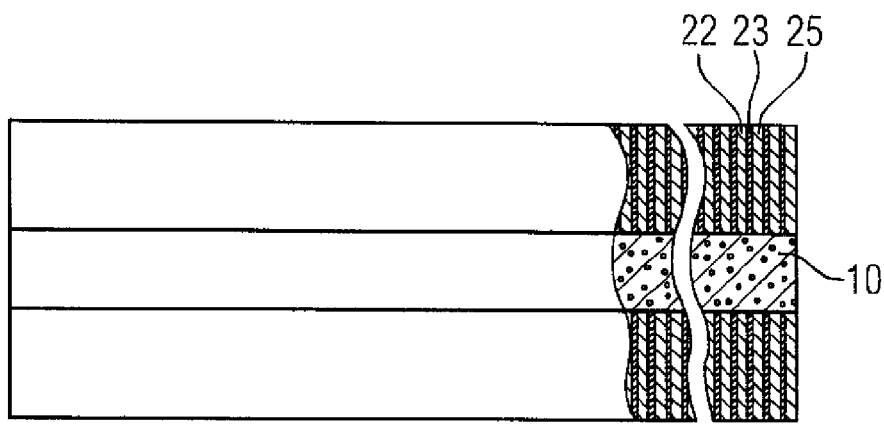
FIG. 2 shows a cross section along the line II-II in FIG. 1.

FIG. 2 shows a cross section of the base element in FIG. 1 along the line II-II. The first pole shoe 4 is formed by electrical steel sheets, which are layered by punch-packing to form a laminated core. Insulating layers 23 are present between the electrical steel sheets, separating the electrical steel sheets electrically with a high resistance as a first region, further first regions, a second region or further second regions with a magnetic permeability index of $\mu_r>2$, thereby reducing eddy currents between the regions during operation of an electric machine with the base element 11. One of the electrical steel sheets of the first pole shoe 4 is a first component 22. A second of the electrical steel sheets is a second component 25. There is therefore an insulating layer 23 present between the first component 22 and the second component 25 of the first pole shoe 4. The first component 22 is connected as a single piece to the first connectors 18, 19. The second pole shoe 7 has the same structure as the first pole shoe 4. As the electrical steel sheets of the first pole shoe 4 and second pole shoe 7, for example the first component 22, are ferromagnetic, they have a magnetic permeability index of $\mu_R$ with a value from 300 to 600,000.

The first contact surface 16 of the permanent magnet 10 touches the electrical steel sheets of the first pole shoe 4, for example the first component 22, directly. A second contact surface 17 of the permanent magnet 10 touches the electrical steel sheets of the second pole shoe 7 directly.

Figure 3:
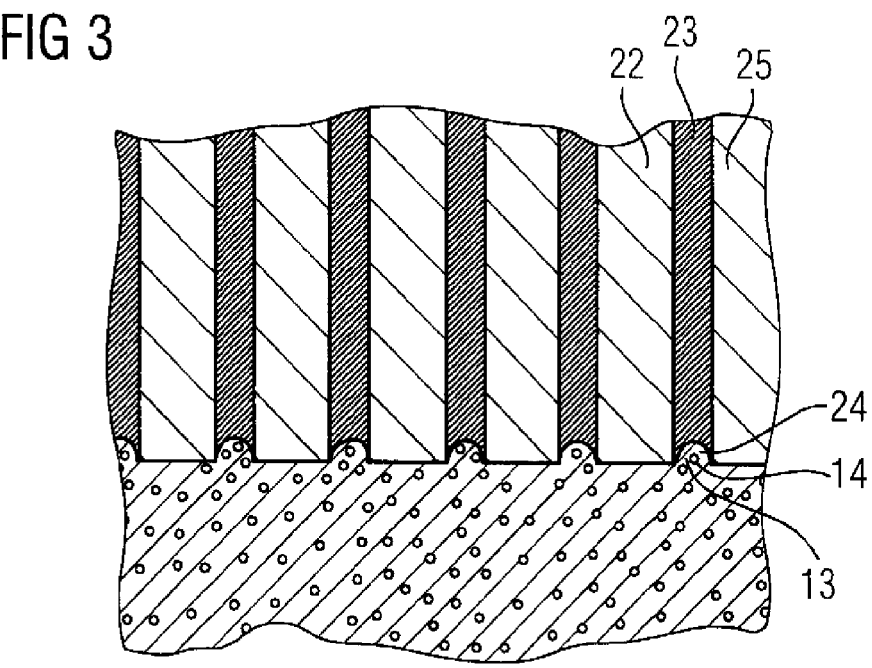
FIG. 3 shows an enlarged section from FIG. 2.

FIG. 3 shows an enlarged section from FIG. 2. FIG. 2 shows that an additional first connector is an intermediate space 24 between the first component 22 and the second component 25 of the first pole shoe 4. During production of the permanent magnet the matrix 13 with the magnetically active material 14 penetrates into the intermediate space 24 and solidifies. A material-fit connection is also produced between the matrix 13 or the magnetically active material 14 and a material of the insulating layer 23 during production of the permanent magnet 10.

Figure 4:
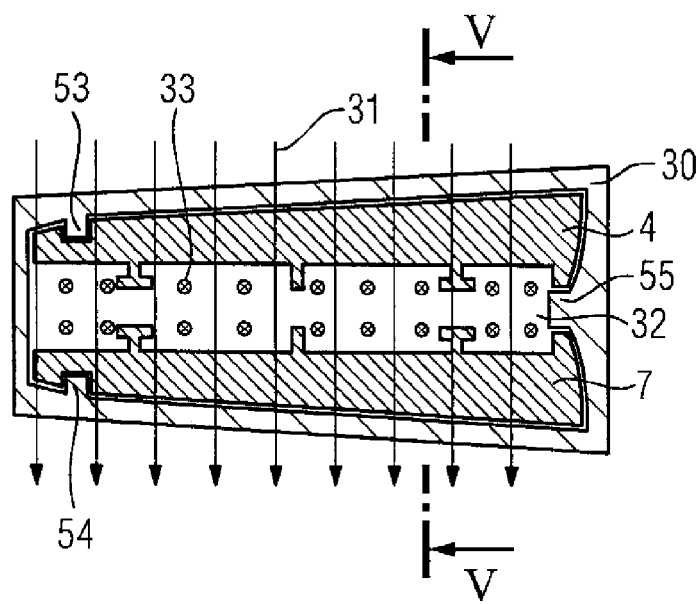
FIG. 4 shows an exemplary embodiment of an apparatus for producing a base element.

FIG. 4 shows an exemplary embodiment of an apparatus 60 for producing a base element. In one exemplary embodiment of a method for producing a base element 11 the first pole shoe 4 and the second pole shoe 7 are inserted into a tool 30. The tool 30 has a first lug 53, a second lug 54 and a third lug 55, The three lugs 53, 54, 55 allow the first and second pole shoes 4 and 7 to be inserted precisely into the tool 30 and their position to be determined precisely. The first pole shoe 4, the second pole shoe 7 and the tool 30 thus form a cavity 32, which can be filled with the matrix 13 and the magnetically active material 14 so that after the matrix 13 has been cured, the permanent magnet 10 with its first and second contact surfaces 16 and 17 has been produced precisely. The third lug 55 of the tool 30 requires an opening 34 on the base element 11. The opening 34 separates the first region from the second region, or the further first regions from the further second regions, at the second ends 6, 9 of the pole shoes 4, 7. The matrix 13, which is an epoxy resin, and the magnetically active material 14, which comprises a neodymium iron boron alloy, are heated to an introduction temperature of approx. 150° C., at which the matrix 13 has a viscous state, before being introduced into the tool 30. After the first pole shoe 4 and the second pole shoe 7 have been inserted into the tool 30, the matrix 13 in the viscous state with the magnetically active material 14 is introduced into the tool 30. The matrix 13 with the magnetically active material 14 is then compressed by the factor 1.3 to 2.

Figure 5:
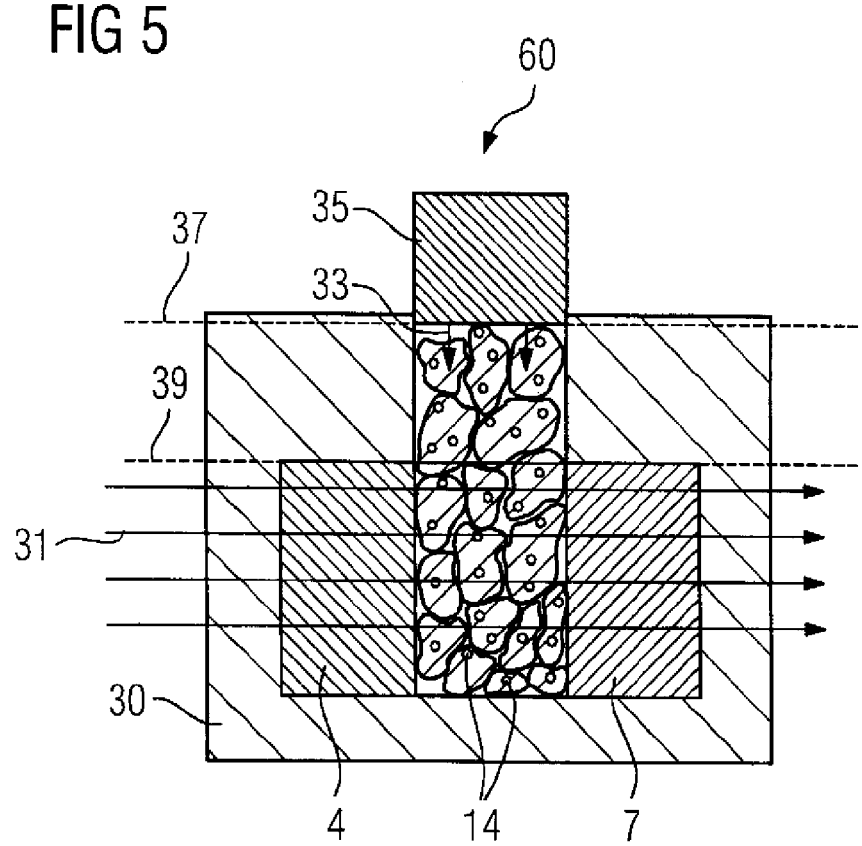
FIG. 5 shows a cross section along the line V-V in FIG. 4.

FIG. 5 shows a cross section through the apparatus 60 in FIG. 4 along the line V-V. The apparatus 60 has at least one stamp 35, which is moved from a first position 37 to a second position 39 in a direction 33. In this process the matrix 13 with the magnetically active material 14 is compressed by the factor 1.3 to 2. As long as the matrix 13 is in a viscous state, an external magnetic field with a direction 31 is present at the tool 30, so that the external magnetic field is directed from the first pole shoe 4 to the second pole shoe 7. During the introduction of the matrix 13 with the magnetically active material 14 the tool 30 is kept at least at a temperature between 80 and 160° C., so that the matrix 13 remains in the viscous state. The magnetically active material 14 can thus align itself in the matrix 13 along a preferred direction predefined by the external magnetic field. After a specified time period has elapsed after the application of the external magnetic field the magnetically active material 14 has aligned itself in the preferred direction so that the temperature of the tool can be lowered. After the tool 30 has cooled to a residual temperature, the external magnetic field is deactivated. The permanent magnet 10 of the base element 11 is then also magnetized by applying an external magnetic field, which also has the direction 31. The external magnetic field for magnetizing the permanent magnet 10 is roughly greater by the factor 2 than the external magnetic field present at the tool 30 during compression of the matrix 13 with the magnetically active material 14. The magnetic flux density of the external magnetic field can be 4.5 Tesla for the additional magnetization.

Figure 6:
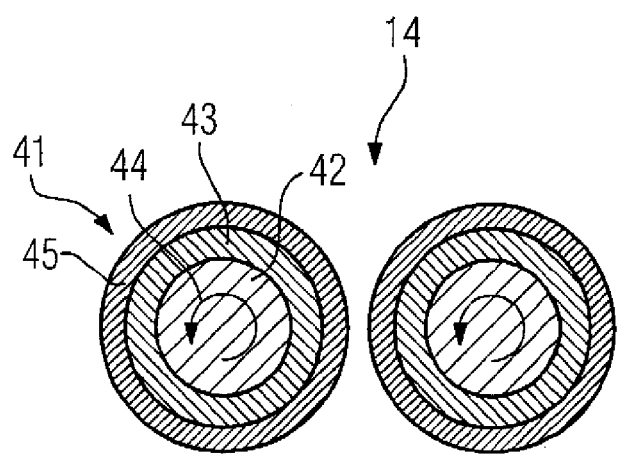
FIG. 6 shows an exemplary embodiment of a magnetically active material.

FIG. 6 shows an exemplary embodiment of a magnetically active material 14, with two grains 41 comprising the magnetically active material 14 being shown by way of representation. A grain 41 has a magnetically active portion 42 and an oxide layer 43. The oxide layer 43 encloses the magnetically active portion 42 of the grain 41. The oxide layer 43 advantageously helps to reduce eddy currents which can flow between two or more grains due to contact between two grains. The eddy current 44 is thus ideally restricted to the interior of a grain 41. If the oxide layer 43 only partially encloses the magnetically active portion 42 of the grain 41, eddy currents between two or more grains are at least reduced. The grain 41 is at least partially enclosed by an interactive layer 45. This layer 45 consists of a resin that enters into a material-fit connection with the matrix 13 subject to the action of a temperature.

Figure 7:
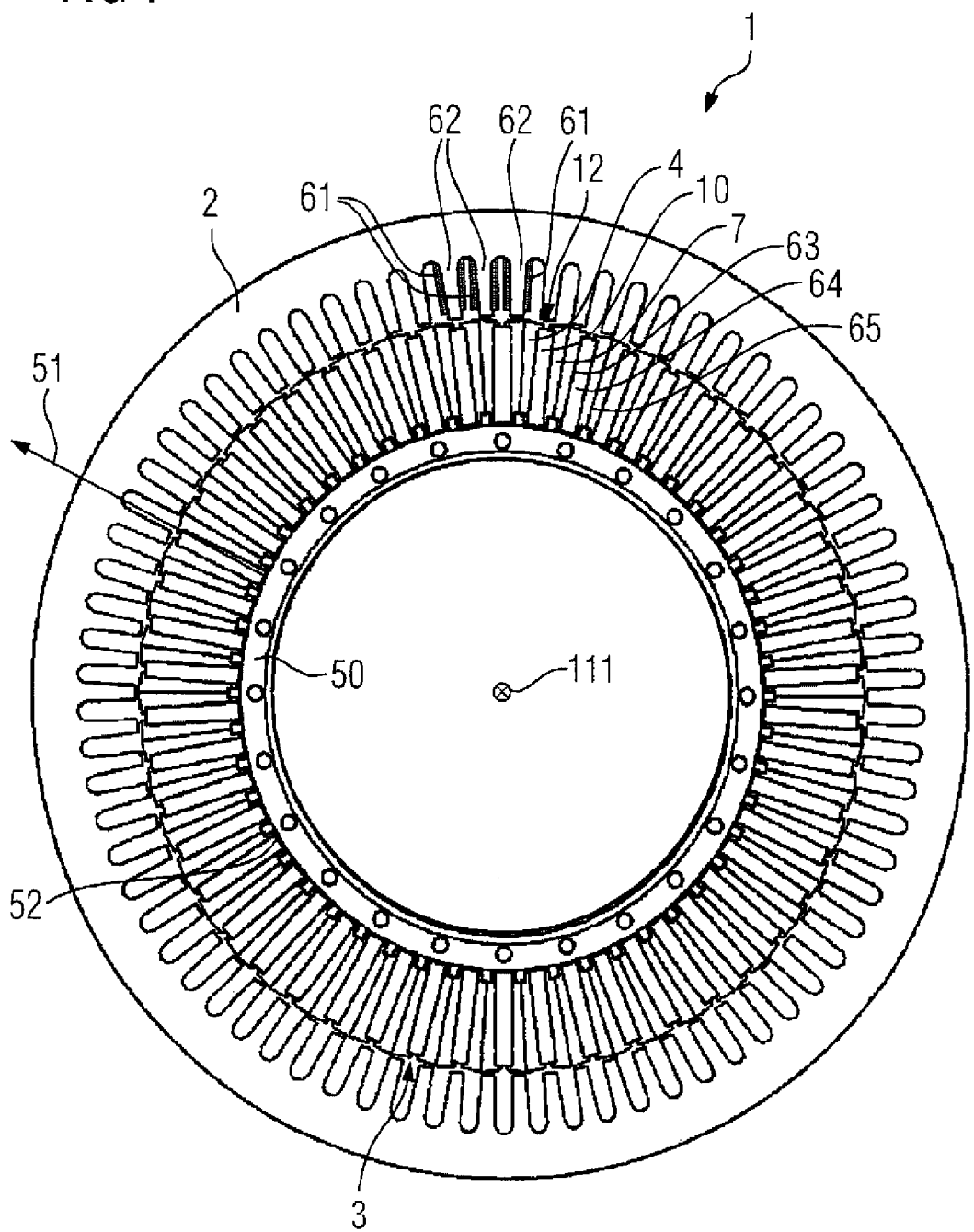
FIG. 7 shows an exemplary embodiment of an electric machine.

FIG. 7 shows an exemplary embodiment of an electric machine 1, which is a torque motor. For the sake of clarity not all the elements are provided with reference characters in FIG. 7. Reference should be made to the reference characters in FIG. 1 for these elements. The torque motor comprises a primary section 2 and a secondary section 3, which is a rotor. During operation of the torque motor the secondary section 3 interacts with the primary section 2 by way of an air gap 12 so that the secondary section 3 rotates about the axis of rotation 111. The torque motor further comprises the first pole shoe 4, which has the first end 5 and the second end 6, the second end 6 facing the air gap 12. The torque motor also comprises the second pole shoe 7, which has the first end 8 and the second end 9, the second end 9 facing the air gap 12. The torque motor further comprises the permanent magnet 10, which has magnetization running from the first pole shoe 4 to the second pole shoe 7. A base element 11, which comprises the first pole shoe 4, the second pole shoe 7 and the permanent magnet 10, is fastened to the secondary section 3, the permanent magnet 10 being disposed between the first pole shoe 4 and the second pole shoe 7. The permanent magnet 10 has a matrix 13, in which a magnetically active material 14 is embedded.

The primary section 2 has 74 teeth 62, to each of which a winding 61 is fastened, which is a tooth coil winding. FIG. 7 shows the windings 61 on three teeth 62 by way of example.

The secondary section 3 has a support 50, which has a cylindrical base form, the base element, which comprises the first pole shoe 4, the second pole shoe 7 and the permanent magnet 10, being fastened to the secondary section 3. A surface normal 51 of a lateral surface 52 of the cylindrical base form extends here from the first end 5 of the first pole shoe 4 to the second end 6 of the first pole shoe 4. The support 50 is made of a material that has a magnetic permeability index of $\mu_r \approx 1$. The support 50 is made of aluminum, solid austenitic stainless steel, a fiber composite or another mechanically resistant material that is not magnetically conductive. The material aluminum or a fiber composite is used if the weight of the secondary section 3 is to be reduced.

The electric machine 1 in FIG. 7 consists of 50 base elements 11, which are disposed concentrically on the lateral surface of the cylindrical base form and fastened to the secondary section 3, in particular the support 50. The 50 base elements 11 are also disposed with rotational symmetry on the lateral surface of the cylindrical base form.

A further first pole shoe 63 and the second pole shoe 7 extend at directly neighboring points on their second ends further into the air gap 12 than at the points on their second ends which are closer to the permanent magnet 10 or the further permanent magnet 64. The directly neighboring point 36 on the second pole shoe 7 is provided with a reference character on the base element 11 in FIG. 1. In FIG. 1 the point 38 on the second pole shoe 7, which is closer to the permanent magnet 10, is also provided with a reference character. A further second pole shoe is provided with a reference character 65.

One exemplary embodiment of a machine tool comprises an electric machine 1, as shown in FIG. 7. A workpiece is connected in a rotationally fixed manner by way of a fastening element to the secondary section 3 so that when the secondary section 3 rotates continuously about the axis of rotation 111 at a specified rotation speed, the workpiece also experiences continuous rotation about the axis of rotation 111 at the specified rotation speed for turning, it being possible for a working point on an outer edge of the workpiece to rotate with a continuous peripheral speed of for example at least 15 m/s about the axis of rotation 111 for turning. Turning here can last for quite a long period of at least 30 seconds to up to a number of minutes at a continuous peripheral speed of at least 15 m/s.

Although the invention has been illustrated and described in detail on the basis of the preferred exemplary embodiment, the invention is not limited by the disclosed examples and other variations can be derived herefrom by the person skilled in the art, without departing from the scope of protection of the invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
    a primary section;
    a secondary section interacting with the primary section via an air gap during operation of the electric machine; and
    a first base element fastened to the secondary section and including a first pole shoe having a first end and a second end, with the second end of the first pole shoe facing the air gap, a second pole shoe having a first end and a second end, with the second end of the second pole shoe facing the air gap, and a permanent magnet disposed between the first pole shoe and the second pole shoe so as to connect the first pole shoe and the second pole shoe with one another and having a magnetization from the first pole shoe to the second pole shoe, said permanent magnet having a matrix with a magnetically active material embedded therein,
    wherein the permanent magnet is arranged to separate a first region of the base element and a second region of the base element from one another, said first pole shoe comprising the first region with magnetically soft properties and a magnetic permeability index of $\mu_r > 2$, and said second pole shoe comprising the second region with magnetically soft properties and a magnetic permeability index of $\mu_r > 2$,
    wherein each of the pole shoes have connections which protrude into the permanent magnet, connect each of the pole shoes with the permanent magnet, and are configured to prevent a displacement of the permanent magnet parallel to each of the pole shoes and perpendicular to each of the pole shoes,
    wherein the connections of the first pole shoe and the connections of the second pole shoe are located opposite to one another in a perpendicular direction, and wherein the connections of each of the pole shoes include a T-shaped connection and a straight perpendicular connection.

2. The electric machine of claim 1, wherein the magnetically active material is defined by a spatial proportion which is greater than a spatial proportion of the matrix.

3. The electric machine of claim 1, wherein the magnetically active material comprises grains having an oxide layer and a magnetically active portion, said magnetically active portion of the grains being enclosed at least partially by the oxide layer.

4. The electric machine of claim 1, wherein the permanent magnet has a first contact surface with the first pole shoe and a second contact surface with the second pole shoe.

5. The electric machine of claim 1, further comprising a connector connecting the first pole shoe to the permanent magnet.

6. The electric machine of claim 1, further comprising at least a second base element fastened to the secondary section and having a first pole shoe extending along the second pole shoe of the first base element from the first end of the second pole shoe to the second end of the second pole shoe of the first base element, a second pole shoe, and a permanent magnet having a magnetization from the second pole shoe of the second base element to the first pole shoe of the base element.

7. The electric machine of claim 1, wherein the secondary section has a support, which has a cylindrical base form, said base element being fastened to the support, wherein a surface normal of a lateral surface of the cylindrical base form extends from the first end of the first pole shoe to the second end of the first pole shoe.

8. The electric machine of claim 1, constructed in the form of a torque motor.

9. The electric machine of claim 1, wherein each of said first and second pole shoes has a plurality of said first and second regions separated from one another.

10. A base element for an electric machine, comprising:
a first pole shoe having a first end and a second end, with the second end of the first pole shoe facing an air gap between a primary section and a secondary section of the electric machine;
a second pole shoe having a first end and a second end, with the second end of the second pole shoe facing the air gap; and
a permanent magnet disposed between the first pole shoe and the second pole shoe so as to connect the first pole shoe and the second pole shoe with one another and having a magnetization from the first pole shoe to the second pole shoe, said permanent magnet having a matrix with a magnetically active material embedded therein,
wherein the permanent magnet is arranged to separate a first region of the base element and a second region of the base element from one another, said first pole shoe comprising the first region with magnetically soft properties and a magnetic permeability index of $\mu_r>2$, and said second pole shoe comprising the second region with magnetically soft properties and a magnetic permeability index of $\mu_r>3$,
wherein each of the pole shoes have connections which protrude into the permanent magnet, connect each of the pole shoes with the permanent magnet, and are configured to prevent a displacement of the permanent magnet parallel to each of the pole shoes and perpendicular to each of the pole shoes,
wherein the connections of the first pole shoe and the connections of the second pole shoe are located opposite to one another in a perpendicular direction, and wherein the connections of each of the pole shoes include a T-shaped connection and a straight perpendicular connection.

11. The base element of claim 10, wherein the magnetically active material is defined by a spatial proportion which is greater than a spatial proportion of the matrix.

12. The base element of claim 10, wherein the magnetically active material comprises grains having an oxide layer and a magnetically active portion, said magnetically active portion of the grains being enclosed at least partially by the oxide layer.

13. The base element of claim 10, wherein the permanent magnet has a first contact surface with the first pole shoe and a second contact surface with the second pole shoe.

14. The base element of claim 10, further comprising a connector connecting the first pole shoe to the permanent magnet.

15. The base element of claim 10, wherein the secondary section has a support, which has a cylindrical base form, said base element being fastened to the support, wherein a surface normal of a lateral surface of the cylindrical base form extends from the first end of the first pole shoe to the second end of the first pole shoe.

16. The base element of claim 10, wherein each of said first and second pole shoes has a plurality of said first and second regions separated from one another.

17. A machine tool, comprising an electric machine including a primary section, a secondary section interacting with the primary section via an air gap during operation of the electric machine, and a base element fastened to the secondary section and including a first pole shoe having a first end and a second end, with the second end of the first pole shoe facing the air gap, a second pole shoe having a first end and a second end, with the second end of the second pole shoe facing the air gap, and a permanent magnet disposed between the first pole shoe and the second pole shoe so as to connect the first pole shoe and the second pole shoe with one another and having a magnetization: from the first pole shoe to the second pole shoe, said permanent magnet having a matrix with a magnetically active material embedded therein, wherein the permanent magnet is arranged to separate a first region of the base element and a second region of the base element from one another, said first pole shoe comprising the first region with magnetically soft properties and a magnetic permeability index of $\mu_r>2$, and said second pole shoe comprising the second region with magnetically soft properties and a magnetic permeability index of $\mu_r>2$,
wherein each of the pole shoes have connections which protrude into the permanent magnet, connect each of the pole shoes with the permanent magnet, and are configured to prevent a displacement of the permanent magnet parallel to each of the pole shoes and perpendicular to each of the pole shoes,
wherein the connections of the first pole shoe and the connections of the second pole shoe are located opposite to one another in a perpendicular direction, and wherein the connections of each of the pole shoes include a T-shaped connection and a straight perpendicular connection.

18. The machine tool of claim 17, wherein each of said first and second pole shoes has a plurality of said first and second regions separated from one another.

19. A method for producing a base element for an electric machine, comprising:
embedding magnetically active material in a matrix to produce a permanent magnet; and
disposing the permanent magnet between a first pole shoe and a second pole shoe, such that the permanent magnet connects the first pole shoe and the second pole shoe with one another and is arranged to separate a first region of the base element and a second region of the base element from one another, said first pole shoe comprising the first region with magnetically soft properties and a magnetic permeability index of $\mu_r>2$, and said second pole shoe comprising the second region with magnetically soft properties and a magnetic permeability index of $\mu_r>2$,
wherein each of the pole shoes have connections which protrude into the permanent magnet, connect each of the pole shoes with the permanent magnet and are configured to prevent a displacement of the permanent magnet parallel to each of the pole shoes and perpendicular to each of the pole shoes,
wherein the connections of the first pole shoe and the connections of the second pole shoe are located opposite to one another in a perpendicular direction, and wherein the connections of each of the pole shoes include a T-shaped connection and a straight perpendicular connection.

20. The method of claim 19, wherein the magnetically active material is defined by a spatial proportion which is greater than a spatial proportion of the matrix.

21. The method of claim 19, wherein the magnetically active material comprises grains having an oxide layer and a magnetically active portion, and further comprising enclosing the magnetically active portion of the grains at least partially by the oxide layer.

22. The method of claim 19, wherein the permanent magnet has a first contact surface with the first pole shoe and a second contact surface with the second pole shoe.

23. The method of claim 19, further comprising connecting the first pole shoe to the permanent magnet.

24. The method of claim 19, further comprising placing the first and second pole shoes in a tool, introducing the matrix into the tool in powder or granular form or in a viscous state with the magnetically active material, compressing the matrix with the magnetically active material in the tool by a factor 1.3 to 2, with the tool having a temperature which is in a working range, applying to the tool an external magnetic field which is directed from the first pole shoe to the second pole shoe, lowering a temperature of the tool to a temperature below the working range after elapse of a specified time period, and deactivating the external magnetic field after the tool has cooled to a residual temperature.

\* \* \* \* \*